[19] Brühmann

[11] Patent Number: 4,794,899
[45] Date of Patent: Jan. 3, 1989

[54] CORRECTION SPRING CAPSULE FOR INJECTION DEVICES OF INTERNAL COMBUSTION ENGINES

[75] Inventor: Werner Brühmann, Stuttgart, Fed. Rep. of Germany

[73] Assignee: Robert Bosch GmbH, Stuttgart, Fed. Rep. of Germany

[21] Appl. No.: 584,951

[22] Filed: Feb. 29, 1984

[30] Foreign Application Priority Data

Jun. 16, 1983 [DE] Fed. Rep. of Germany ....... 3321714

[51] Int. Cl.$^4$ ............................................. F02M 39/00
[52] U.S. Cl. ..................................... 123/373; 123/364; 411/222; 411/259
[58] Field of Search ....................... 123/372, 373, 364; 411/222, 223, 242, 259

[56] References Cited

U.S. PATENT DOCUMENTS

| Re. 30,406 | 9/1980 | Johanson | 411/259 |
|---|---|---|---|
| 2,922,211 | 1/1960 | Boyd | 411/305 |
| 2,947,299 | 8/1980 | Shallenberg et al. | 123/140 |
| 3,234,927 | 2/1966 | Cramer | 123/140 |
| 3,377,700 | 3/1967 | Maddalozzo | 123/140 |
| 3,572,303 | 3/1971 | Becker et al. | 123/140 |
| 3,662,804 | 5/1972 | Krywitsky | 411/259 |
| 3,766,899 | 10/1973 | Isselhorst | 123/140 |
| 3,884,206 | 5/1975 | Ritter | 123/140 R |
| 3,946,775 | 3/1976 | Stauch | 123/140 R |
| 4,038,958 | 8/1977 | Susuki | 123/373 |
| 4,267,808 | 5/1981 | Djordjevic et al. | 123/373 |
| 4,281,630 | 8/1981 | Bruhmann | 123/373 |
| 4,286,558 | 9/1981 | Djordjevic | 123/373 |
| 4,287,630 | 8/1981 | Brühmann et al. | 123/373 |
| 4,748,290 | 4/1979 | Knorreck | 123/140 R |

FOREIGN PATENT DOCUMENTS

| 7077223 | 6/1957 | Fed. Rep. of Germany | 123/373 |
|---|---|---|---|
| 3233038 | 4/1983 | Fed. Rep. of Germany | 123/373 |
| 804279 | 11/1958 | United Kingdom | 123/373 |

Primary Examiner—Carl Stuart Miller
Attorney, Agent, or Firm—Edwin E. Greigg

[57] ABSTRACT

A correction spring capsule which has a stop bolt inserted in a stepped longitudinal bore of a housing embodied as a screw sheath, a correction spring and an adjusting screw, which forms the abutment for the correction spring. This adjusting screw has the form of a cup-shaped adjusting ring provided with a continuous external thread and having a bottom and a sheath-like wall. The sheath-like wall is deformed into an oval shape in order to attain positional fixation of the adjusting screw and has its greatest deformation in the vicinity of one end section that is open toward the outside. As a result, the adjusting screw is infinitely adjustable and is secured in a positionally fixed manner in any position inside the housing in the vicinity of an internal thread.

11 Claims, 1 Drawing Sheet

CORRECTION SPRING CAPSULE FOR INJECTION DEVICES OF INTERNAL COMBUSTION ENGINES

This application is copending with application Ser. No. 584,961, filed Feb. 29, 1985, which relates thereto.

BACKGROUND OF THE INVENTION

The invention is based on a correction spring capsule for injection devices. A spring capsule of this kind is already known (U.S. Pat. Nos. 3,234,927 and 4,281,630), which acts as a torque-control capsule; it is threaded into a holder integral with the governor housing and it acts counter to the force of a governor spring upon a lever arm of a governor lever actuated at the end of its other lever arm by a centrifugal governor member. The onset of torque control is determined by means of the initial stress of the correction spring acting as a torque-control spring, and the dimension by which the stop bolt protrudes determines an always identical, maximum possible torque-control stroke. The adjusting screw serving to adjust the initial stress of the correction spring is screwed for part of its total length into the internal thread of the housing and is secured in its installed position by means of a counter nut tensed against the rear end face of the housing that is remote from the stop bolt. This form of embodiment of the torque-control capsule, with the counter nut resting on the housing and the adjusting screw that because of the opportunity for adjustment and fixation protrudes beyond this nut, has a structural length that is necessarily quite long, precluding the use of such a spring capsule in restricted spaces. A further disadvantage of effecting the positional securing of the adjusting screw by means of the counter nut is that if the adjusting screw, which carries the abutment for the correction spring, is precisely adjusted, this accurate adjustment is negated entirely when the counter nut is tightened; in other words, the initial stress of the correction spring that has been established when the counter nut is loose is reduced in accordance with the tightening torque of the counter nut and the strength of the thread as a result of the axial tension on the adjusting screw exerted during the tightening of the counter nut. The adjustment process must therefore be repeated several times, thereby increasing the expense of adjustment.

OBJECT AND SUMMARY OF THE INVENTION

The correction spring capsule according to the invention has the advantage that the adjusting screw, which is deformed into an oval shape over part of its total length, in the vicinity of the sheath-like wall, remains immovably in any established position, because of its shaping, and thus has a self-locking feature. Additional securing means which either increase the structural length or in the case of plastic securing means, such as microencapsulated plastic, reduce the reliability of positional fixation are avoided. Since the adjusting screw embodied in accordance with the invention is accommodated inside the internal thread of the housing, the overall structural length of the correction spring capsule is determined by the housing thereof. The short length thereby attainable makes it possible to use the spring capsule even in restricted spaces, as in the case for instance of the centrifugal rpm governors known from German Pat. No. 1 011 223 and sold as Type EP-RSV... by Robert Bosch GmbH, D-7000 Stuttgart, Federal Republic of Germany.

Advantageous further embodiments and improvements of the invention disclosed are possible. In particular, in a capsule embodied as an adjusting screw the installation of the adjusting screw is unhindered by the deformed sheath-like wall, since the external thread retains its normal, circular outer contour in the vicinity of the bottom. Adjusting screws embodied in this manner and are usable particularly for installation in correction spring capsules can also be used advantageously not only on spring capsules but also at other locations of the rpm governor or on injection pumps of internal combustion engines. For instance, full-load or idling adjusting screws, in which the wall may carry a stop pin as well, can be embodied and adjusted in the same manner, and can also be fixed in the established position without requiring additional securing means. If the adjusting screw is pressed into an oval shape by a dimension that is slightly higher than the maximum possible thread tolerances, then a particularly important advantage of the invention exists, namely that during mounting of the adjusting screw this screw remains permanently deformed by a dimension that is dependent on the tolerances of both cooperating threads, while a virtually constant remnant tension, one that is specific to the material used and dependent on the thickness of the wall, assures a reliable fixation of the rotational position regardless of the operating temperature or the frequency which adjustment is performed. These advantages are not found in any known securing means. The tool recess disposed in the center of the bottom of the adjusting screw, the maximum diameter of which recess is smaller than the inside diameter of the adjusting screw in the vicinity of its sheath-like wall, facilitates mounting of the adjusting screw and enables a shaping and deformation of the wall that is unaffected by the tool. By means of the hardened spring plate used in the spring capsule embodied in accordance with the invention, the specific load on the abutment for the torque- control spring is reduced, and guidance and adjustability of the spring are improved. In order to avoid a reduction in the initial stress of the torque-control spring caused by spring settling over the life of the governor, the abutment that is disposed in a depression to receive the spring would otherwise have to be hardened on the adjusting screw, which would be more costly and labor-intensive. Furthermore, because of the reduced friction when the spring plate is used, the torsion exerted on the correction spring is reduced.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
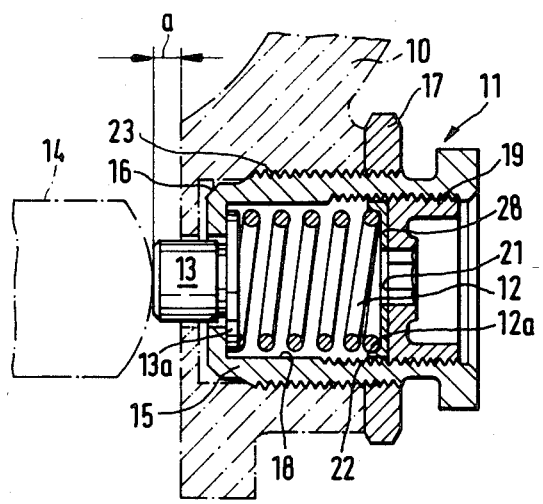
FIG. 1 is a longitudinal section taken through the first exemplary embodiment of a correction spring capsule embodied in accordance with the invention and shown larger than actual size.

A correction spring capsule 11, here acting as a torque-control capsule, is screwed into the force-transmitting member 10, shown in dot-dash lines, of a centrifugal rpm governor that is known in terms of its basic design from the EP/RSV governors by Robert Bosch GmbH, D-7000 Stuttgart, Federal Republic of Germany, and hence not otherwise shown. The stop bolt 13 of the correction spring capsule 11, loaded by a correction spring 12, cooperates with a sleeve bolt 14 indicated by dot-dash lines in order to control the process of torque control.

The correction spring capsule 11 has a housing 15 embodied as a threaded sheath in which it is threaded along its outside from an end face of the governor remote from the sleeve bolt 14 to a stepped longitudinal bore 16 of the force-transmitting member 10 and is secured in its installed position by a counter nut 17. The housing 15 includes a stepped longitudinal bore 18 which receives a stop bolt 13, the correction spring 12 and an adjusting screw 19. The stop bolt 13 protrudes through an aperture beyond the force-transmitting member 10 and with its protruding dimension "a", which is dependent on the installed position of the torque-control capsule 11 in the force-transmitting member 10, it determines a torque-control stroke. The stop bolt 13 is held in its outset position, shown, by the correction spring 12, and the correction spring 12 is supported at one end on a head 13a of the stop bolt 13 and on the other end on an abutment 21 embodied by an end face of the adjusting screw 19. For receiving the adjusting screw 19, the stepped longitudinal bore 18 of the housing 15 has an internal thread 22, and in the vicinity of this internal thread 22 the adjusting screw 19 is secured in a positionally fixed manner solely by means of its special shaping, as has already been noted.

Figure 2:
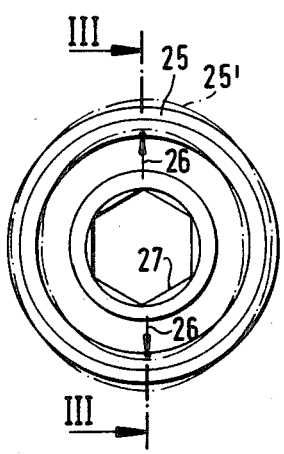
FIG. 2 is a view in the direction of the arrow II of FIG. 3 toward the adjusting screw used.
Figure 3:
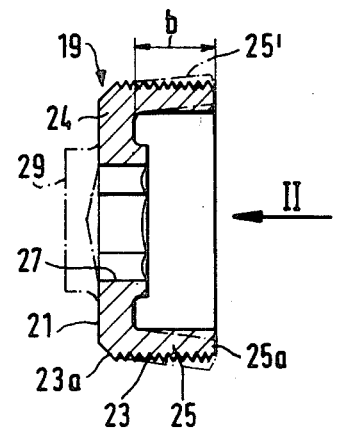
FIG. 3 is a cross section taken along the line III—III of FIG. 2.

In FIGS. 2 and 3, the adjusting screw 19 is shown in an end view and a sectional representation, respectively, that are on a still larger scale than FIG. 1. This adjusting screw 19 takes the form of a cupshaped adjusting ring provided with a continuous external thread 23 and a bottom 24 as well as a hollow-cylindrical, sheath-like wall 25. In order to avoid additional means for positionally securing the adjusting screw 19 inside the internal thread 22 of the housing 15, the adjusting screw 19 is deformed into an oval shape over a portion of its length, in the vicinity of the sheath-like wall 25, prior to being installed in the housing 15. This deformation of the wall 25 is indicated by dot-dash lines in FIGS. 2 and 3. The circular shape of the sheath-like wall 25 shown by a solid line in the drawing is more or less assumed by this wall 25 in the installed state as well; that is, some of the deformation plastically resumes its initial shape upon being threaded into the internal thread 22 of the housing 15; a constant remnant deformation remains on the adjusting screw 19, however, and in the installed state it exerts a tensional force that acts upon the internal thread 22 and thereby assures the desired positional fixation of the adjusting screw 19. This force is dependent upon both the thickness of the wall 25 and the modulus of elasticity and elastic limit of the material used. A very good positional fixation, which meets the demands made of centrifugal rpm governors, is attained, for instance in an adjusting screw 39 provided with a thread M 14×1, by means of a wall thickness of approximately 1.5 mm and a deformation depth "c" (see FIG. 3) of 4 mm. The greatest deformation takes place in an end section 25a of the wall 25, as also shown in FIGS. 2 and 3. To this end, the wall 25 is pressed outward ovally, out of the hollow-cylindrical shape it originally had when manufactured, at two diametrically opposed points marked with arrows 26 in FIG. 2, by a total of approximately 0.5 mm and thereby attains the elliptical cross section shown at 25' in dot-dash lines in FIG. 2.

In the vicinity of the bottom 24 that with its end face forms the abutment 21 for the correction spring 12, the external thread 23 retains its normal, circular contour at one end, marked 23a, while only at the opposite end, in the vicinity of the end section 25a of the sheath-like wall 25 that is open toward the outside, does the greatest deformation take place, corresponding to the deformation of the wall 25. As a result, the adjusting screw 19 can easily be inserted with its first few threads into the internal thread 22 without exerting force, for instance by hand, and then adjusted into the installed position shown in FIG. 1 by using an adjusting tool. So that the adjusting tool can engage it, the bottom 24 of the adjusting screw 19 is provided with a central opening 27 formed as a tool receiving recess. This opening 27 is embodied as a hexagon in the present case, so that a conventional Allen wrench can be used as the adjusting tool. In order to make unauthorized intervention difficult, of course this opening 27 may be given some other, irregular form, into which only a special tool can fit. In terms of its greatest length, in this case the corner measurement of the internal hexagon, the opening 27 must be embodied as smaller than the inside diameter of the sheath-like wall 25, to enable the deformation of the wall and the introduction of the tool without the two operations affecting one another.

In order to reduce the torsion on the correction spring 12 during the rotation of the adjusting screw and to avoid settling of the correction spring 12 and stripping of the spring windings in the internal thread 22, one end 12a of the torque-control spring 32 oriented toward the adjusting screw 19 is, as may be seen in FIG. 1, held by a hardened spring plate 28 that receives this end 12a on its end face and radially. The spring plate 28 rests in turn on the abutment 21 located on the adjusting screw 19 and is guided radially in the longitudinal bore 18 of the housing 15.

On the mode of operation of the correction spring capsule 11 embodied according to the invention and the adjusting spring 19, the following points should also be noted:

If the correction spring capsule 11 is used to direct the process of torque control as a torque-control capsule, and if the rpm existing at the onset or end of torque control does not correspond to the rpm fixed by the test specification, then the adjusting screw 19 may be rotated by means of an adjusting tool introduced into the opening 27 at the adjusting screw 19, if necessary even with the governor in operation, and the initial stress of the correction spring 12 thereby varied until such time as the torque-control movement begins or ends at the desired rpm. Because of the holding force resulting from the deformation of the wall 25, the adjusting screw 19 is held in any established position, without additional securing means. The torque-control stroke fixed by the protruding dimension "a" and thus substantially the rpm difference as well remain constant and are not affected by a change in initial stress; in other words, the difference in length of the control path, which is proportional to the torque-control stroke, that is traveled by the governor rod in controlling the torque control process retains the value previously established by the protruding dimension "a" of the stop bolt 13. If some other torque-control stroke is required, then this stroke may be adjusted, if necessary with the governor in operation, by rotating the entire correction spring capsule 12, without varying or affecting the onset of torque control. The established position is secured by the counter nut 17.

A correction spring capsule embodied in the same manner can also be used at some other location on the governor as a starting spring capsule or an additional idling spring capsule. Correction spring capsules embodied in the same manner can also be used as automatic increased-fuel-quantity stops on the injection pump, thereby lengthening the governor rod, where the initial stress of the correction spring determines the rpm at which the increased starting quantity, fixed by the protruding dimension of the stop bolt, is retracted by pushing the governor rod back to a position in which it controls the full-load injection quantity.

The adjusting screw 19, embodied in accordance with the invention as a self-locking screw, can also be used as a stop screw at some other location of the rpm governor or injection pump. For an application of this kind, the adjusting screw 19 may as needed have a bolt-like or tang-like cylindrical protrusion 29, indicated by dot-dash lines in FIG. 3, in the vicinity of its bottom 24. In that case, the opening 27 is embodied as a blind bore.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A correction spring capsule for injection devices of internal combustion engines, said capsule includes a housing, a stepped longitudinal bore in said housing, said housing is embodied as a screw sheath having screw threads along a portion of said bore, a stop bolt having a portion thereof protruding beyond said housing, a correction spring which presses said bolt in its outset position against a shoulder in the longitudinal bore, the initial stressing force of the correction spring being adjustable by means of an adjusting screw that includes one end face that forms an infinitely adjustable abutment for the correction spring and that said adjusting screw includes threads on an external surface and is screwed into an internal thread in the housing and positionally secured therein, said adjusting screw takes the form of a cup-shaped adjusting ring provided with a continuous external thread and having a bottom end face abutment, as well as a sheath-like wall, said adjusting ring is formed into an oval shape along a part (b) of its total length, in the vicinity of the sheath-like wall prior to being threaded into said housing whereby said adjusting ring is deformed from said oval shape on being threaded into said housing and thereby exerts a tensional force on the threads along said oval shape that fixes said adjusting ring in said housing.

2. A correction spring capsule as defined by claim 1, in which the external thread of the adjusting screw at an end, in the vicinity of the bottom of said housing, has its normal, circular outer contour and at the opposite end, in the vicinity of an end section of the sheath-like wall that is open toward the outside, has its greatest deformation.

3. A correction spring capsule as defined by claim 2, in which said sheath-like wall is preferably a hollow-cylindrically fabricated, sheath-like wall of the adjusting screw which is pressed outward prior to installation into an oval shape in the vicinity of one end section and having the greatest deformation at two diametrically opposed points by a total of approximately 0.5 mm and there has an elliptical cross section.

4. A correction spring capsule as defined by claim 1, in which the bottom of the adjusting screw is provided with a central opening shaped to receive a tool, the greatest diametrical length of which opening is smaller than the inside diameter of the adjusting screw in the vicinity of its sheath-like wall.

5. A correction spring capsule as defined by claim 1, in which one end of the correction spring is oriented toward the adjusting screw, and held by a hardened spring plate receiving said one end radially at the end face, which spring plate in turn rests on said abutment located on the adjusting screw and is radially guided in the longitudinal bore of the housing.

6. An adjusting screw for a correction spring capsule in which the adjusting screw has the form of a cup-shaped adjusting ring provided with a continuous external thread and having a bottom as well as a sheath-like wall, said adjusting ring is deformed into an oval shape over a part of its total length, in the vicinity of the sheath-like wall.

7. An adjusting screw as defined by claim 6, in which the external thread of the adjusting screw at one end in the vicinity of the bottom has a normal circular outer contour and at an opposite end, in the vicinity of an end section of the sheath-like wall that is open toward the outside, has its greatest deformation.

8. An adjusting screw as defined by claim 7, in which said sheath-like wall is preferably a hollow-cylindrically fabricated, sheath-like wall of the adjusting screw and is pressed outward prior to installation into an oval shape in the vicinity of the end section having the greatest deformation at two diametrically opposed points by a total of approximately 0.5 mm and there has an elliptical cross section.

9. An adjusting screw as defined by claim 6 in which the bottom of the adjusting screw is provided with a central opening shaped to receive a tool, the greatest diametrical length of which is smaller than the inside diameter of the adjusting screw in the vicinity of its sheath-like wall.

10. An adjusting screw as defined by claim 7 in which the bottom of the adjusting screw is provided with a central opening shaped to receive a tool, the greatest diametrical length of which is smaller than the inside diameter of the adjusting screw in the vicinity of its sheath-like wall.

11. An adjusting screw as defined by claim 8 in which the bottom of the adjusting screw is provided with a central opening shaped to receive a tool, the greatest diametrical length of which is smaller than the inside diameter of the adjusting screw in the vicinity of its sheath-like wall.

* * * * *